United States Patent [19]
Goke et al.

[11] Patent Number: 5,720,005
[45] Date of Patent: Feb. 17, 1998

[54] CIRCUIT AND METHOD FOR PROCESSING LOWER LIMIT VALUE FUZZY INPUTS DURING A FUZZY LOGIC OPERATION

[75] Inventors: L. Rodney Goke; Meltin Bell, both of Austin, Tex.

[73] Assignee: Motorola, Inc., Schaumburg, Ill.

[21] Appl. No.: 381,367

[22] Filed: Jan. 31, 1995

[51] Int. Cl.$^6$ ................................... G06G 7/00
[52] U.S. Cl. .................. 395/51; 395/3; 395/900
[58] Field of Search ................... 395/51, 3, 900

[56] References Cited

U.S. PATENT DOCUMENTS

| | | | |
|---|---|---|---|
| 5,398,299 | 3/1995 | Ota et al. | 395/3 |

FOREIGN PATENT DOCUMENTS

| | | | |
|---|---|---|---|
| 6-110695 | 4/1994 | Japan | G06F 9/44 |
| 6-110696 | 4/1994 | Japan | G06F 9/44 |
| 6-119146 | 4/1994 | Japan | G06F 7/24 |
| 6-119177 | 4/1994 | Japan | G06F 9/44 |
| 6-161763 | 6/1994 | Japan | G06F 9/44 |
| 6-290047 | 10/1994 | Japan | G06F 9/44 |
| 6-348744 | 12/1994 | Japan | G06F 15/31 |

OTHER PUBLICATIONS

Dagum, Leonardo "Data Parallel Sorting for Particle Simulation," Concurrency: Practice and Experience, vol. 4(3), May 1992, pp. 241–255.

Molnar, Steven,.et al., "A Sorting Classification of Parallel Rendering," IEEE Computer Graphics and Applications, Jul. 1994, pp. 23–32.

Varman, Peter J., et al., "Sorting with Linear Speedup on a Pipelined Hypercube," IEEE Transactions on Computers, vol. 41, No. 1, Jan. 1992, pp. 97–103.

Hillis, W. Daniel, et al., "Data Parallel Algorithms," Communications of the ACM, Dec. 1986, vol. 29, No. 12, pp. 1170–1183.

Knuth, Donald E., "The Art of Computer Programming," vol. 3/Sorting and Searching, 1973, pp. 80–82; 95–99; 139–142.

*Primary Examiner*—Tariq R. Hafiz

[57] ABSTRACT

The present invention, which is implemented in a data processing system, includes a method for performing a fuzzy logic operation, wherein the steps are: (1) performing a rule evaluation process on a plurality of fuzzy input values, wherein one or more of the plurality of fuzzy input values has a lower limit (zero) value, and wherein the rule evaluation process (i) implements a rulebase including a plurality of rules associating a plurality of fuzzy inputs with a plurality of fuzzy outputs, (ii) results in one or more fuzzy output values, and (iii) further includes processing the one or more of the fuzzy input values having the lower limit value with respect to the rulebase, and (2) processing the fuzzy input values having a non-lower limit value with respect to the rulebase, the processing of the fuzzy input values having the non-lower limit value performed separately from the processing of the one or more of the fuzzy input values having the lower limit value. Sorting of the non-lower limit values may be performed. Sorting may be performed using an insertion sort method wherein elements of an unsorted list stored within a vector register are compared to a growing vector of sorted values, and each element from the unsorted list is then inserted into the sorted list. Alternatively, sorting may be performed by simultaneously comparing all of the elements of an unsorted list and then transferring the largest value to a second list, wherein this process is repeated for each element in the unsorted list.

6 Claims, 11 Drawing Sheets

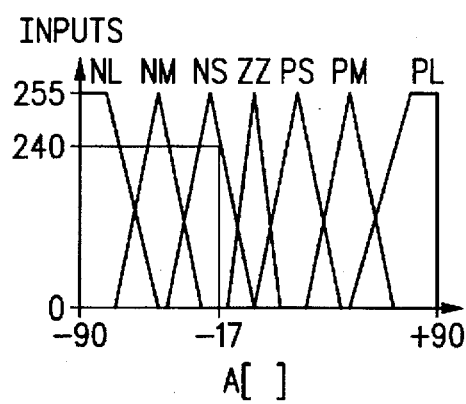

NL = NEGATIVE LARGE
NM = NEGATIVE MEDIUM
NS = NEGATIVE SMALL
ZZ = ZERO
PS = POSITIVE SMALL
PM = POSITIVE MEDIUM
PL = POSITIVE LARGE

*FIG.5*

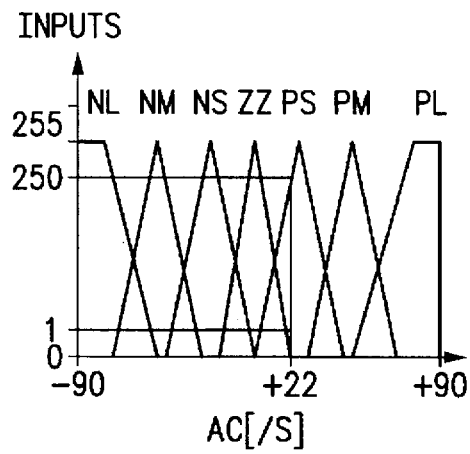

NL = NEGATIVE LARGE
NM = NEGATIVE MEDIUM
NS = NEGATIVE SMALL
ZZ = ZERO
PS = POSITIVE SMALL
PM = POSITIVE MEDIUM
PL = POSITIVE LARGE

*FIG.6*

|   | AC |   |   |   |   |   |   |
|---|----|----|----|----|----|----|----|
|   | NL | NM | NS | ZZ | PS | PM | PL |
| NL |  |  |  | PL |  |  |  |
| NM |  |  |  | PM |  |  |  |
| NS |  |  |  | PS | PS |  |  |
| A ZZ | PL | PM | PS | ZZ | NS | NM | NL |
| PS |  |  | NS | NS |  |  |  |
| PM |  |  |  | NM |  |  |  |
| PL |  |  |  | NL |  |  |  |

A = ANGLE
AC = ANGULAR CHANGE
NL = NEGATIVE LARGE
NM = NEGATIVE MEDIUM
NS = NEGATIVE SMALL
ZZ = ZERO
PS = POSITIVE SMALL
PM = POSITIVE MEDIUM
PL = POSITIVE LARGE

*FIG.7*

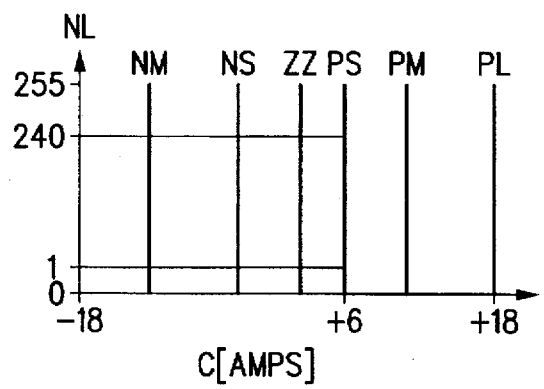

NL = NEGATIVE LARGE
NM = NEGATIVE MEDIUM
NS = NEGATIVE SMALL
ZZ = ZERO
PS = POSITIVE SMALL
PM = POSITIVE MEDIUM
PL = POSITIVE LARGE

*FIG.8*

CIRCUIT AND METHOD FOR PROCESSING LOWER LIMIT VALUE FUZZY INPUTS DURING A FUZZY LOGIC OPERATION

FIELD OF THE INVENTION

This invention relates generally to a data processing system, and more particularly to execution of fuzzy inference calculations in a data processing system.

BACKGROUND OF THE INVENTION

Data processors have been developed to function as binary machines whose inputs and outputs are either interpreted as ones or zeroes, and no other possibilities may exist. While this works well in most situations, sometimes an answer is not simply "yes" or "no," but something in between. A concept referred to as "fuzzy logic" was developed to enable data processors based on binary logic to provide an answer between "yes" and "no."

Fuzzy logic is a logic system which has membership functions with fuzzy boundaries. Membership functions translate subjective expressions, such as "temperature is warm," into a value which typical data processors can recognize. A label such as "warm" is used to identify a range of input values whose boundaries are not points at which the label is true on one side and false on the other side. Rather, in a system which implements fuzzy logic, the boundaries of the membership functions gradually change and may overlap a boundary of an adjacent membership set. Therefore, a degree of membership is typically assigned to an input value. For example, given two membership functions over a range of temperatures, an input temperature may fall in the overlapping areas of both the functions labeled "cool" and "warm." Further processing would then be required to determine a degree of membership in each of the membership functions.

A step referred to as "fuzzification" is used to relate an input to a membership function in a system which implements fuzzy logic. The fuzzification process attaches concrete numerical values to subjective expressions such as "the temperature is warm." These numerical values attempt to provide a good approximation of human perception which is not generally limited to an environment of absolute truths. After the fuzzification step, a rule evaluation step is executed. During execution of the rule evaluation step, a technique referred to as "MIN-MAX" fuzzy inference is used to calculate numerical conclusions to linguistic rules defined by a user. Conclusions from the rule evaluation step are referred to as "fuzzy outputs" and may be true to varying degrees. Thus, competing results may be produced. A last step in the fuzzy logic process is referred to as "defuzzification." As the name implies, defuzzification is the process of combining all of the fuzzy outputs into a composite result which may be applied to a standard data processing system. For more information about fuzzy logic, refer to an article entitled "Implementing Fuzzy Expert Rules in Hardware" by James M. Sibigtroth. The article was published in the April, 1992 issue of AI EXPERT on pages 25 through 31.

During the above-noted MIN-MAX technique, the rule evaluation process, for a particular rule, receives fuzzy inputs from the fuzzification process, outputs the minimum value of selected fuzzy inputs to produce a rule strength, by which the grade of the fuzzy output associated with the rule is determined, which is then compared with other rule strengths/fuzzy output grades, whereby the maximum value of selected rule strengths is then outputted as a fuzzy output. Referring to FIG. 1, MIN functional block 100 receives a fuzzy input along with other fuzzy inputs. The MIN functional block takes the minimum of the selected fuzzy inputs to produce a rule strength, which is then combined with other rule strengths within MAX functional block 101, which takes the maximum value of the selected inputted rule strengths to produce a fuzzy output. Generally, the minimum value that a fuzzy input can have is a zero value. As can be readily seen, if any one of the selected fuzzy inputs into MIN functional block 100 has a zero value, the outputted rule strength from MIN functional block 100 will take on that zero value. However, any "lower limit value" (being the lowest value that a fuzzy input may have) will produce the same effect. Thus, the lower limit value may be 0, 1, –33, etc.

Among fuzzification, rule evaluation/fuzzy inference and defuzzification, rule evaluation is often the most computationally expensive task performed in fuzzy logic systems. Many systems utilizing a sequential processor will rescan rules and refetch or recompute zero fuzzy inputs. Since a fuzzy input grade of zero for a rule means a corresponding zero value for that rule strength and since a significant majority of fuzzy input grades of typical fuzzy systems characteristically have zero values, significant computation time and resources are wasted scanning the rules and performing fuzzy AND-OR/MIN-MAX operations on zero values.

Thus, there is a need in the art for a fuzzy logic operation that more efficiently processes zero fuzzy input values.

SUMMARY OF THE INVENTION

The foregoing need is fulfilled by the present invention, which implements, in a data processing system, a method for performing a fuzzy logic operation, the method comprising the steps of (1) performing a rule evaluation process on a plurality of fuzzy input values, wherein one or more of the plurality of fuzzy input values may have a zero value, and wherein the rule evaluation process (i) implements a rulebase comprising a plurality of rules associating a plurality of fuzzy inputs with a plurality of fuzzy outputs, (ii) results in one or more fuzzy output values, and (iii) further comprises processing the one or more of the fuzzy input values having the zero value with respect to the rulebase, and (2) processing the fuzzy input values having a non-zero value with respect to the rulebase, the processing of the fuzzy input values having the non-zero value performed separately from the processing of the zero or more of the fuzzy input values having the zero value.

Alternatively, instead of the zero value, a lower limit value, e.g., 0, 1, 122, –18, etc., may be processed in a similar manner.

In a preferred embodiment, the method as recited above may further comprise the step of storing the plurality of rules in a memory array, wherein each of the plurality of fuzzy inputs is associated with a column in the memory array, and wherein each of the plurality of fuzzy outputs is associated with a row in the memory array, and wherein each of the plurality of rules corresponding to a particular one of the plurality of fuzzy outputs is stored within a subrow of the row, wherein a length of the subrow equals a number of the plurality of fuzzy inputs. A width (number of subrows) of a row is the number of rules associated with a fuzzy output.

In an alternative embodiment of the present invention, the fuzzy input values are sorted before processing of the non-zero fuzzy input values.

Sorting of a list of values, such as the above fuzzy input values, may be performed by (1) initializing a sorted output vector register to zero, (2) selecting an element of an unsorted input vector register containing the list of values to be sorted, (3) simultaneously comparing the element of the unsorted input vector register with all elements of the sorted output vector register, (4) simultaneously deactivating processing with respect to any of the elements of the sorted output vector register that are greater than the element of the unsorted input vector register, (5) simultaneously shifting downward the elements of the sorted output vector register that are not greater than the element of the unsorted input vector register, (6) inserting the element of the unsorted input vector register into a first element of the elements of the sorted output vector register that were not greater than the element of the unsorted input vector register prior to the shifting downward of the elements of the sorted output vector register that are not greater than the element of the unsorted input vector register, and (7) reactivating processing capabilities with respect to any of the elements of the sorted output vector register that are greater than the element of the unsorted input vector register.

An alternative method for sorting (1) initializes a vector register to contain the values to be sorted, (2) initializes a sorted output list to empty, (3) concurrently compares the values, (4) selects a largest one of the values compared, (5) appends the selected value to the sorted output list, and (6) inserts a zero value into the selected element of the vector register previously occupied by the largest one of the values. Steps (3), (4), (5) and (6) may be repeated in some embodiments of the present inventions. In addition, some embodiments of the present invention may omit steps (2) and (5).

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates an exemplary fuzzy membership set associated with the angle off vertical in the inverted pendulum problem;

FIG. 6 illustrates an exemplary fuzzy membership set associated with the angle change in the inverted pendulum problem;

FIG. 7 illustrates a matrix diagramming a rulebase for the inverted pendulum problem;

FIG. 8 illustrates membership sets for defuzzification with respect to the inverted pendulum problem;

DETAILED DESCRIPTION OF A PREFERRED EMBODIMENT

Figure 1:
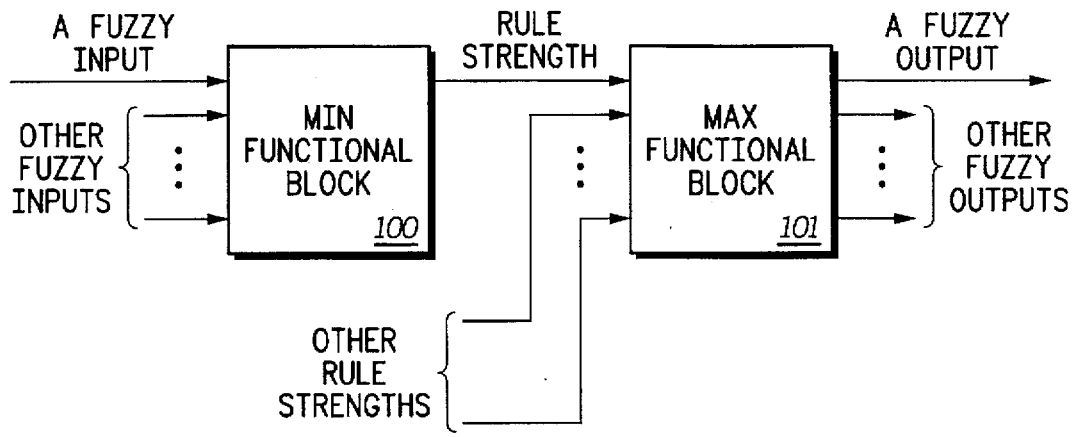
FIG. 1 illustrates a typical fuzzy logic system.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
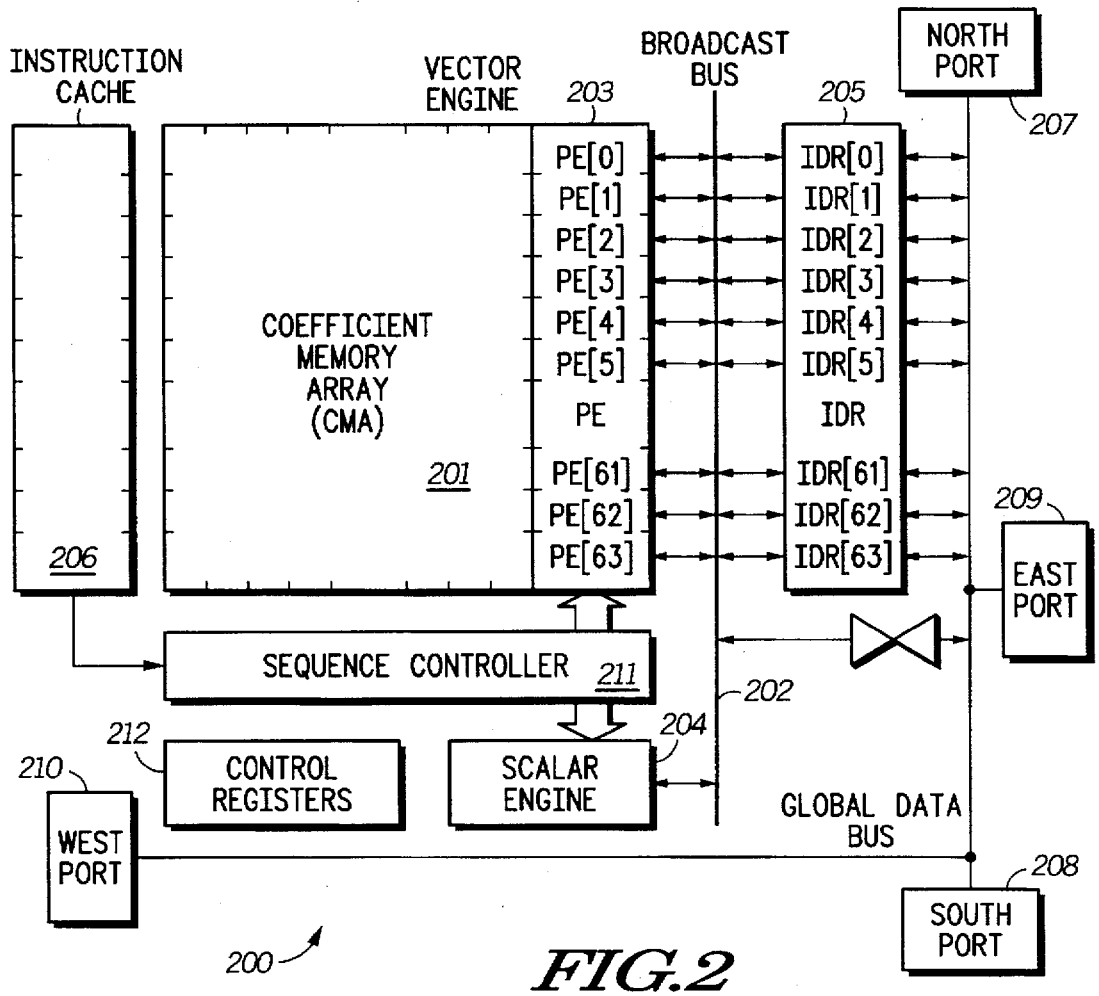
FIG. 2 illustrates a processing system configurable for implementing the present invention.

Although the present invention may be applied to fuzzy logic systems implemented in sequential processors, the present invention will be described with reference to a SIMD (single instruction, multiple data) processing architecture, which enables it to execute simultaneous instructions across a plurality of different pieces of data. FIG. 2 illustrates such a SIMD processor 200. The broadcast bus 202 makes possible data communication among the various vector processors 203 (comprising N processing elements (PE)) and the scalar engine 204. Each double arrow illustrated in FIG. 2 represents a data path and indicates that various units can communicate with each other through this channel bidirectionally.

The coefficient memory array (CMA) 201 functions as the general-memory storage space for working data and data arrays. The CMA space may be composed of 4,096 bytes of SRAM in which a row of 64 bytes is allocated to each of 64 processing elements (PEs) 203. Although the bytes are laid by row (PE number) and column (vector number), in the CMA 201, an application can move them around as needed. The processing elements 203 use the CMA 201 to store data, either as preliminary data or as results. The CMA 201 can interact with the processing elements 203 and with the input data register (IDR) 205. The CMA 201 can be configured to contain portions of an executable program. If an application program exceeds 128 instructions, some of the program code may be stored in the CMA 201 and transferred into the instruction cache 206 when a cache miss occurs.

The IDR 205 is the main input data path for the SIMD processor 200. At run time, it is the only input data path, and all data flows into the IDR 205. Data streams in through one of the north, south, east or west ports (207, 208, 209, 210, respectively) from external system hardware (not shown) or another SIMD processor (not shown) and into the IDR 205. Then it is up to the application program to access the data, either acting on it directly out of the IDR 205 or transferring the data to temporary storage space in the vector registers. Processing elements 203 can have either scalar or vector access to the IDR 205. With scalar access, all processing elements 203 of the SIMD processor 200 can access the same IDR byte at a given time. Every byte that is written into the IDR 205 is broadcast to all 64 of the processing elements 203. With vector access, all 64 bytes of the IDR 205 are loaded and then presented to all 64 processing elements 203 as a vector. Thus, byte 0 of the IDR 205 is presented to vector processing element 0, and byte 63 of the IDR 205 is presented to vector processing element 63. When this method is used, the entire IDR 205 is filled before any computations begin, but once it is filled, all contents of the IDR 205 can be processed simultaneously.

The instruction cache 206 provides fast access to instructions. All instructions go through the instruction cache 206 before they are executed. The instruction cache memory space may total 256 bytes or 128 words; if the contents of a program exceed this space limit, the additional code may be stored in the CMA 201.

Each of the processing elements 203 has its own arithmetic logic unit (ALU) enabling it to perform both arithmetic and logical functions. All processing elements 203 may operate in parallel, receiving identical commands from the sequence controller 211.

Using its own separate ALU, the scalar engine 204 performs functions similar to those of the processing elements 203 and is typically responsible for controlling and redirecting programs within the SIMD processor 200. The scalar engine 204 is concerned with global control operations, receiving commands from the sequence controller 211 and keeping control of pointers and flow of control types of operations.

The sequence controller 211 accesses instructions from the instruction cache 206, determines whether they are scalar or vector operations, and dispatches these commands to the appropriate place (either the processing elements 203 or the scalar engine 204). The sequence controller 211 also determines the order of instruction execution when branching occurs.

The control registers 212 may contain several controls for setting up and initializing the SIMD processor 200 so that it runs in a mode that is applicable for a given application. Some of the registers 212 may be loaded during initialization, while others may be loaded via instructions that write the registers 212 themselves.

For a more detailed description of the SIMD processor 200 illustrated in FIG. 2, please refer to U.S. patent application Ser. No. 08/040,779 to Gallup et al., assigned to a common assignee, which is hereby incorporated by reference herein.

Implementation of the present invention within the SIMD processor 200 will be hereinafter described with reference to a classic two-dimensional control problem known as the "inverted pendulum." Referring to FIG. 3, the idea is to keep a pole 301 vertically balanced. The pole 301 is weighted at the top and attached at the bottom to a movable base 302. If the pole 301 falls to the right or left, the base 302 moves in the same direction to compensate. By monitoring the angle (A) and angular change (AC) of the pendulum 301, a fuzzy system 304 can determine the proper force to apply at the base 302 to keep the pole 301 balanced. For example, the fuzzy system 304 can be coupled to a motor 303 coupled to the base 302. The output of a fuzzy system 304 can be the amps required to activate the motor 303 in a sufficient manner to move the base 302 for maintaining the pole 301 at a vertically balanced position. FIG. 4 illustrates a simple block diagram of the fuzzy system 304 receiving the inputs "angle" and "angular change" and outputting the fuzzy output "amps."

Referring next to FIGS. 5 and 6, there are illustrated exemplary fuzzy membership sets associated with the system inputs angle and angular change. The exact set of rules utilized within the fuzzy system depends on the dynamics of the physical components of the inverted pendulum, the required robustness, and the range of operating conditions.

Theoretically, the rulebase described below is sufficient to balance the pendulum 301, but other solutions exist:

| (1) | IF A IS NL AND AC IS ZZ, THEN C IS PL; |
|---|---|
| (2) | IF A IS NM AND AC IS ZZ, THEN C IS PM; |
| (3) | IF A IS NS AND AC IS ZZ, THEN C IS PS; |
| (4) | IF A IS NS AND AC IS PS, THEN C IS PS; |
| (5) | IF A IS ZZ AND AC IS NL, THEN C IS PL; |
| (6) | IF A IS ZZ AND AC IS NM, THEN C IS PM; |
| (7) | IF A IS ZZ AND AC IS ZZ, THEN C IS ZZ; |
| (8) | IF A IS ZZ AND AC IS PS, THEN C IS NS; |
| (9) | IF A IS ZZ AND AC IS PM, THEN C IS NM; |
| (10) | IF A IS ZZ AND AC IS PL, THEN C IS NL; |
| (11) | IF A IS PS AND AC IS NS, THEN C IS NS; |
| (12) | IF A IS PS AND AC IS ZZ, THEN C IS NS; |
| (13) | IF A IS PM AND AC IS ZZ, THEN C IS NM; |
| (14) | IF A IS PL AND AC IS ZZ, THEN C IS NL; |
| (15) | IF A IS ZZ AND AC IS NS, THEN C IS PS. |

A = angle
AC = angular change
NL = negative large
NM = negative medium
NS = negative small
ZZ = zero
PS = positive small
PM = positive medium
PL = positive large
C = current FIG. 7 illustrates a matrix diagramming the above rulebase.

Figure 3:
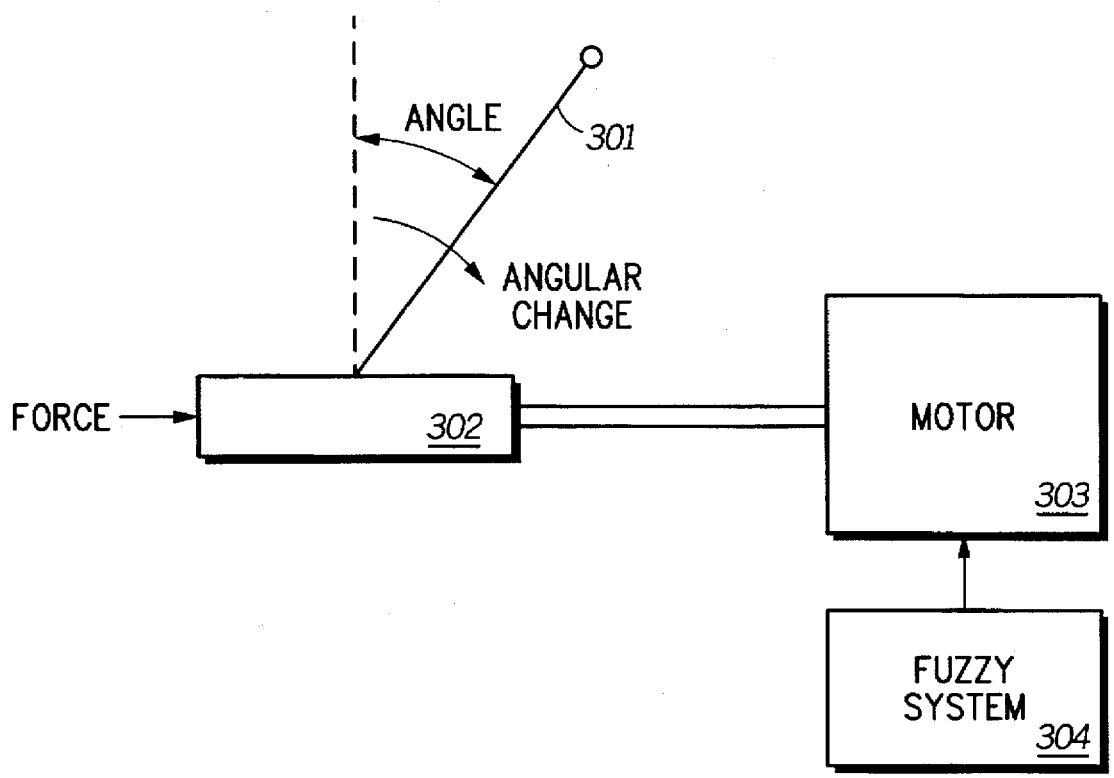
FIG. 3 illustrates a diagram of an inverted pendulum problem.
Figure 4:
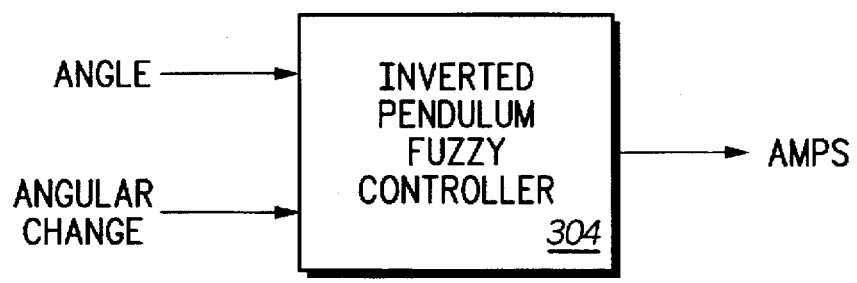
FIG. 4 illustrates a block diagram of a fuzzy logic system for controlling an inverted pendulum.

Essentially, a fuzzy logic operation implemented within the SIMD processor 200 will implement the membership sets for angle (A) and angular change (AC) as illustrated in FIGS. 5 and 6, receive system inputs from some type of measuring devices (not shown) coupled to the inverted pendulum 301 illustrated in FIG. 3, produce fuzzy input values that are then applied to the rulebase illustrated in FIG. 7, resulting in a fuzzy output signal (C), which is defuzzified according to the singleton membership sets illustrated in FIG. 8 in order to provide a system output value of amps to apply to the motor 303 coupled to the inverted pendulum 301. Please note that the membership functions illustrated may also take the shape of a trapezoid, a rectangle, or a bell-shaped form (or any other mathematical function).

As briefly discussed above, many fuzzy logic systems, such as the one described above, spend a considerable amount of computation time during the fuzzy inference stage because of the large number of fuzzy inputs and rules that must be scanned during fuzzy AND-OR operations. Since a fuzzy input grade of zero for a rule means a corresponding zero fuzzy output value for that rule, and since a majority of the fuzzy input grades of many fuzzy systems characteristically have zero values, significant computation time and resources are wasted scanning the rules and performing fuzzy AND-OR/MIN-MAX operations on zero values. The following discussion will address this significant drawback to fuzzy logic systems with a unique process that improves the performance of such systems.

Figure 9:
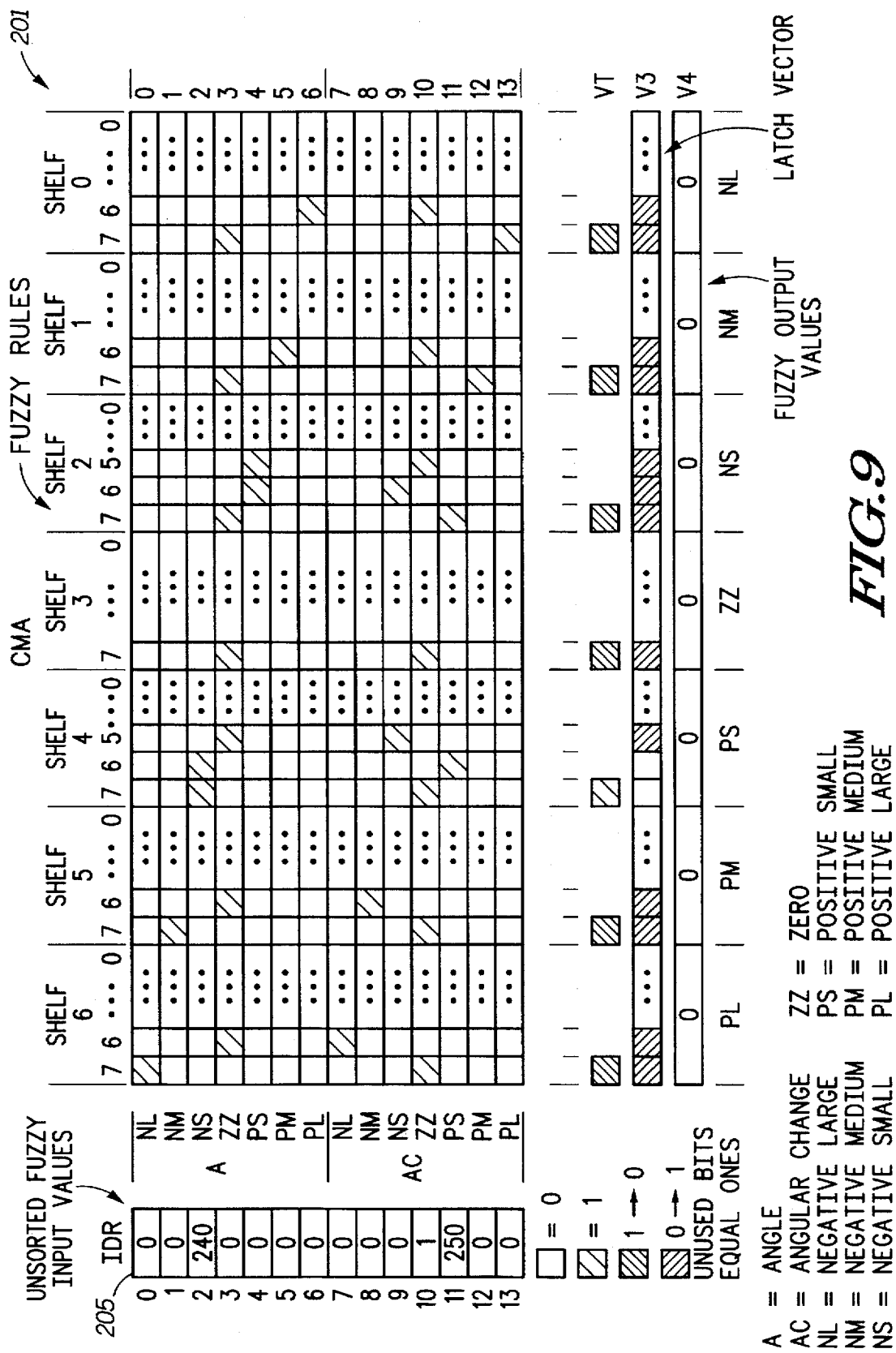
FIG. 9 illustrates portions of the processor illustrated in FIG. 2 during processing of zero fuzzy inputs.

One aspect of the present invention sorts the fuzzy inputs and maintains/tracks the relationship of fuzzy input to membership function so that the non-zero fuzzy inputs and rules using them will facilitate efficient scanning of the knowledge base. A second aspect of the present invention, which generates the fuzzy outputs from the sorted fuzzy inputs by efficiently scanning the rules/knowledge base, is closely related to the rule knowledge base format. As indicated above, the present invention is concerned with more efficiently processing fuzzy inputs within the rule evaluation process of a fuzzy logic operation. Though not necessary, utilization of the SIMD processor 200 promotes a more efficient rule evaluation process. Referring to FIG. 9, there is illustrated portions of the SIMD processor 200—primarily the IDR 205 and the CMA 201. Additionally, there is illustrated the registers V3 and V4, which may be portions of the CMA 201 or PE 203. The IDR 205 is utilized to store the fuzzy input values, which are received from the fuzzification process. The register V4 is utilized to store the fuzzy output values, which are then defuzzified as briefly described above. Note, the values within the register V4 are initialized to zero.

Within the following description, values are preferably organized as 8-bit bytes. Note, other word sizes may be utilized within the present invention.

The bits within the register VT, which is associated with the vector process control register (VPCR) (not shown), are initialized to 1, while the bits within the register V3 are initialized to 0. Note that in some embodiments of the present invention, each processing element has an associated VT bit which is located in the vector process control register (VPCR) as a portion of the VPCR. In alternate embodiments of the present invention, the VT bits may instead be considered as a separate register VT.

The CMA 201 is divided into a plurality of Shelves, each corresponding to a processing element 203 associated with a fuzzy output. Each Shelf, or row, preferably contains 8 subrows.

Fourteen columns of the CMA 201 have each been assigned to one fuzzy input (and one of the processing elements 203). Each rule stored within the CMA 201 takes up a subrow of bits in the CMA 201. The length of the subrow equals the number of fuzzy input member functions (in this example, fourteen). All subrows contributing to a fuzzy output are grouped together in a CMA row (in this example, up to 8 rules may affect a fuzzy output). Note that if a rule contributes to more than one fuzzy output, then multiple subrows are required for that rule.

Subrows that will not contribute to a fuzzy output are filled with 1's to facilitate a latching mechanism described below. As indicated, for each rule, the bits within each subrow that are set to 1 identify the fuzzy input membership functions contributing to a fuzzy output, while those fuzzy input membership functions not contributing to a particular fuzzy output for this same subrow/rule are set to 0. For the 2-input, 1-output fuzzy logic system implementing the inverted pendulum problem, exactly 2-bits are set in a subrow for each rule. As configured, the CMA 201 implements the rulebase illustrated in FIG. 7. For example, the 1 bits located within the most significant bit (subrow 7) of Shelf 6, columns 0 and 10 implement rule (1) above.

The present invention implements a method in that zero value fuzzy inputs are processed separately from the processing of non-zero value fuzzy inputs. Thus, the fuzzy inputs corresponding to columns 0, 1, 3, 4, 5, 6, 7, 8, 9, 12 and 13 of the IDR 205 will be processed separately from the processing of the fuzzy input values corresponding to columns 2, 10 and 11 of the IDR 205.

As indicated above, the unassigned subrows within the shelves within the CMA 201 are set to 1s. The present invention processes columns 0, 1, 3, 4, 5, 6, 7, 8, 9, 12 and 13, containing zero fuzzy input values one at a time through the rule evaluation process. Since the fuzzy output values are initialized to 0, through the use of the MIN/MAX method of rule evaluation, the zero fuzzy input values do not need to be transferred through the rule evaluation process to the fuzzy output values. As noted above, a "lower limit value" may be initialized into vector register V4 to correspond to processing of lower limit fuzzy input values instead of zero fuzzy input values.

The "lower limit value" is defined to be the lowest possible value that a fuzzy input value can have. The "lower limit value" may be zero, or it may be any other predetermined number. Consequently, the "non-lower limit value" is defined to be any number that is not equal to the "lower limit value". For example, if the "lower limit value" is zero, then the "non-lower limit value" may be any number but zero.

For each zero fuzzy input value within the IDR 205, the present invention takes the corresponding column within the CMA 201 and ORs it with the byte vector in the register V3. When this is first performed with respect to column 0, the unused subrows within column 0, containing all 1s, are ORed with the corresponding zero values within the register V3, resulting in 1s being inserted within these unused subrows within the register V3. Furthermore, the 1 bit located within subrow 7 of Shelf 6 is ORed with the corresponding zero value within the register V3, resulting in that bit changing from a 0 bit to a 1 bit. The remaining bits within the register V3 remain as 0 bits. As each one of the remaining columns within the CMA 201, corresponding to the zero fuzzy inputs within the IDR 205, are ORed within the byte vector in the register V3, the register V3 will eventually contain bit values as illustrated in FIG. 9, wherein one type of cross-hatched bits represents those bits within the register V3 that were changed from a 0 bit to a 1 bit as a result of the above ORing process.

If any byte within the register V3 contains all 1s, the corresponding bit within the register VT changes from a 1 bit to a 0 bit. The presence of a 0 bit within the VT register corresponding to a particular byte corresponding to a particular fuzzy output indicates that processing for that fuzzy output will cease (i.e., those processing elements have been disabled). Note that the checking for all 1s (i.e., a comparison with hexadecimal FF) may be performed after the processing of each column corresponding to a zero fuzzy input, or may be performed after the processing of all zero fuzzy inputs.

It should be noted that the processing elements 203 may perform the various functions described herein on their respective Shelves.

Figure 10:
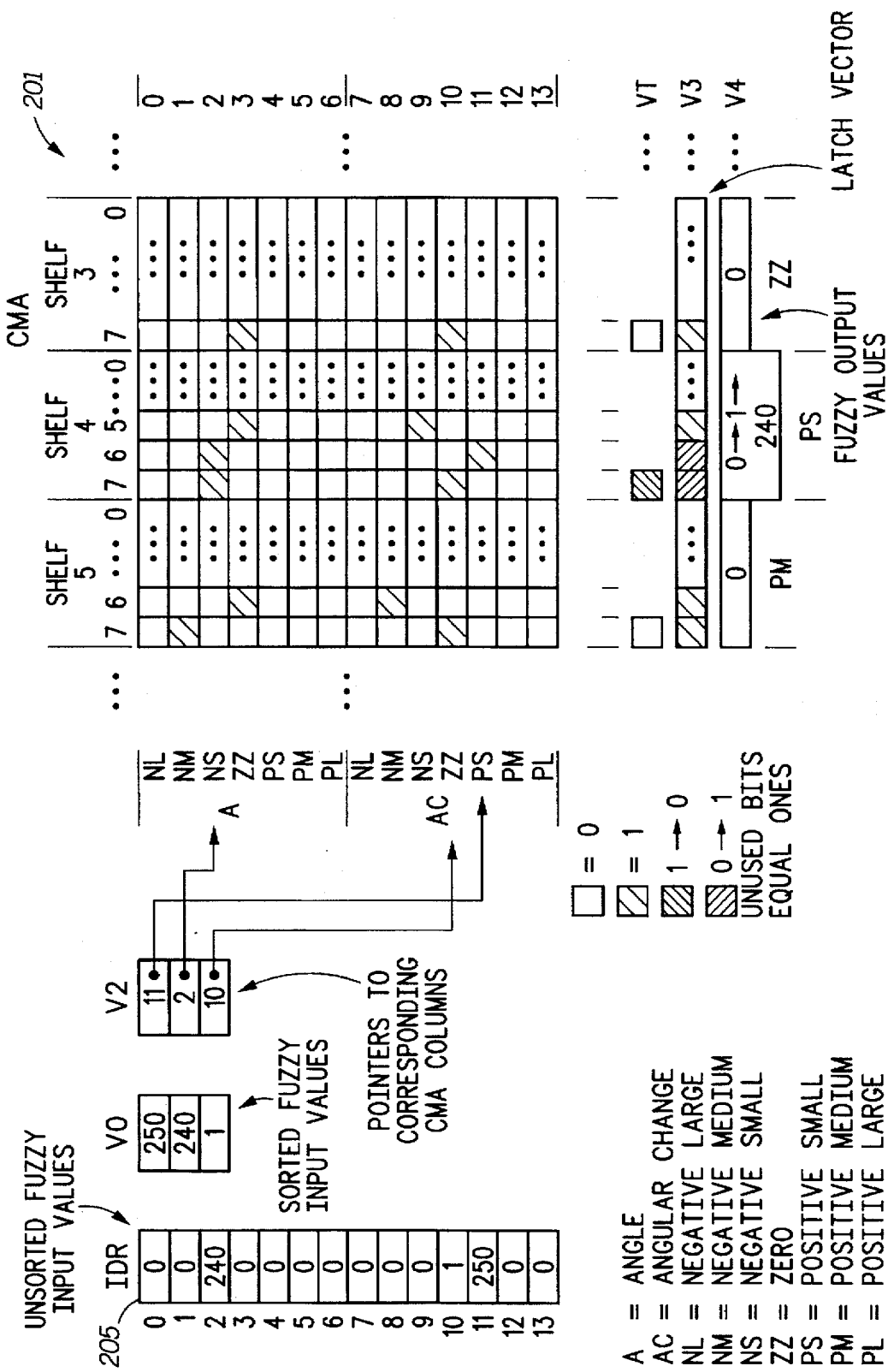
FIG. 10 illustrates portions of the processor illustrated in FIG. 2 during processing of non-zero fuzzy inputs.

Referring next to FIG. 10, there is illustrated those portions of the CMA 201 and the VT, V3 and V4 registers remaining after processing of zero fuzzy inputs. The present invention now processes the non-zero fuzzy inputs. In a manner described below, the non-zero fuzzy inputs are first sorted from least to greatest. Note, the fuzzy input values could also be sorted before processing of zero fuzzy inputs and the present invention would operate in a similar manner because sorting of least to greatest would result in the zero fuzzy inputs being processed before the non-zero fuzzy inputs.

The sorted fuzzy input values are stored within the register V0. Within the register V2, pointers are stored corresponding to the IDR column number from where the corresponding non-zero fuzzy input values originated. These pointer values are utilized to point to the appropriate corresponding CMA columns when processing each of the non-zero fuzzy inputs.

The registers V0, V2, V3, V4 may individually or collectively be implemented in either the CMA 201 or with their corresponding processing elements 203.

The first non-zero fuzzy input value processed is the one residing within column 10 and having a value of 1, corresponding to the zero (ZZ) membership function within the "angular change" (AC) membership set. Shelves 3, 4, and 5 each have rules corresponding to the ZZ fuzzy input of system input AC. In a manner similar as described above, column 10 of the CMA 201 is ORed with the remaining corresponding bytes within the register V3. However, since the bits within the VT register corresponding to fuzzy outputs PM and ZZ are both 0, processing with respect to these 0 outputs is no longer required. ORing of the byte corresponding to Shelf 4 and column 10 within the CMA 201 with the corresponding byte within the register V3 results in bit 7 of the byte within the register V3 corresponding to Shelf 4 changing from a 0 bit to a 1 bit. Thereafter, the fuzzy output value within the register V4 takes on the value of the fuzzy input corresponding to Shelf 4, column 10 within the CMA 201, which is the 1 value from the register V0 and from element 10 of the IDR 205.

Since the byte within the register V3 corresponding to Shelf 4 does not contain all 1s (hexadecimal FF), processing continues with the remaining non-zero fuzzy inputs. The next non-zero fuzzy input is the value 240 corresponding to column 2. Then, the bits corresponding to the subrows within Shelf 4, and corresponding to column 2 within the CMA 201, are ORed with the bits within the register V3, resulting in bit 6 within that corresponding byte in the register V3 changing from a 0 bit to a 1 bit. Consequently, the fuzzy output value takes on the value of the fuzzy input corresponding to Shelf 4, column 2, which is the 240 value in the register V0 and element 2 of the IDR 205.

Now, since all bits within the register V3 contain a 1 bit, the corresponding bit within the register VT changes from a 1 to a 0, concluding processing with respect to this fuzzy output (i.e., processing element).

However, there remains one more non-zero fuzzy input value, 250, corresponding to column 11. However, as stated s above, since processing of all fuzzy outputs has ceased, the processing of the 250 fuzzy input value is not performed.

As a result of the foregoing, the SIMD processor 200 outputs a fuzzy output value of 240 for the fuzzy output PS (positive small).

Referring back to FIG. 8, the 240 value for a positive small (PS) fuzzy output corresponds, in this example, to +6 amps provided to the motor 303 coupled to the inverted pendulum apparatus.

As can be readily seen, the utilization of the SIMD processor 200, along with the CMA 201, results in an ability to process many fuzzy inputs in parallel. The processing of zero fuzzy inputs separate from the processing of the non-zero fuzzy inputs also results in a considerable savings in computation time.

Figure 12:
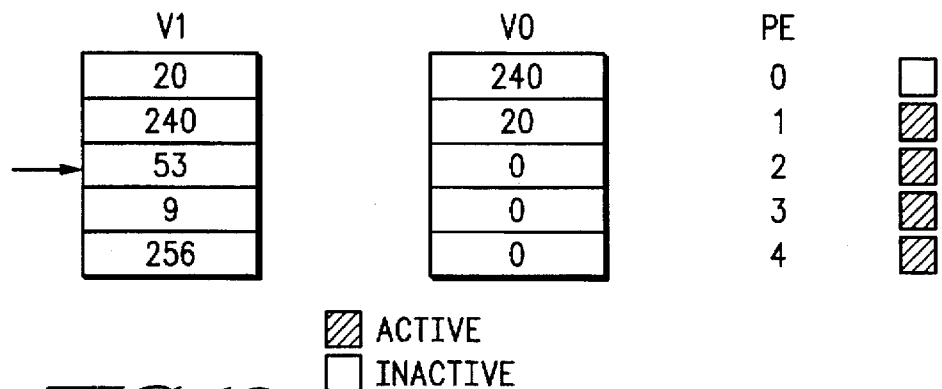
FIG. 12 illustrates vector registers utilized during the insertion sorting process.

In the above description, during processing of the zero fuzzy inputs, there was no concern as to whether or not the fuzzy input values were sorted. However, during processing of the non-zero fuzzy input values, a sorted list of these fuzzy input values was produced (see FIG. 10), along with the corresponding indices into the IDR 205 register indicating where the non-zero fuzzy input values originated. In one alternative, an insertion sort method is utilized on an unsorted input list of non-zero fuzzy input values. Referring to FIG. 12, there is illustrated the vector registers V1 and V0, which may be implemented within the processing elements 203. The register V1 contains the unsorted non-zero fuzzy input values corresponding to processing elements 0–4. The vector register V0 is similar to the register V0 illustrated in FIG. 10, and contains a partially sorted list of fuzzy input values. Essentially, the goal is to take the fuzzy input values within the vector register V1, sort these values, and store sorted fuzzy input values within the register V0. FIG. 12 illustrates a "snapshot" in time, wherein the first two fuzzy input values, 20 and 240, have already been sorted into the vector register V0. The fuzzy input value, 53, is now being sorted. This fuzzy input value will be compared simultaneously to each element within the vector register V0. If the fuzzy input value being processed is not greater than any sorted value within the vector register V0, the processing element corresponding to that vector register element will be deactivated. Thus, in FIG. 12, PE 0 has been deactivated since 53 is not greater than 240, which is stored in PE 0.

Figure 11:
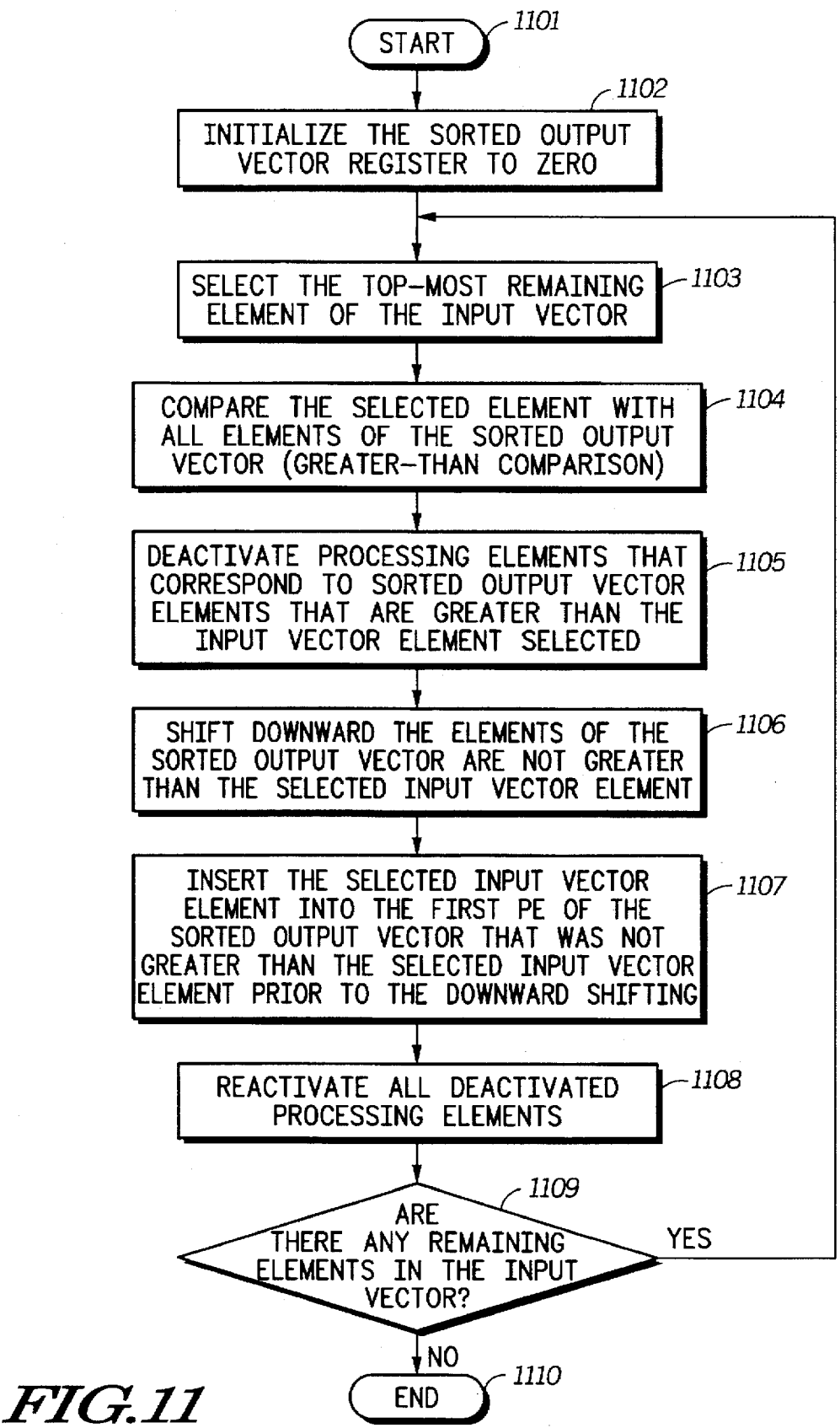
FIG. 11 illustrates a flow diagram describing an insertion sorting process.
Figure 13:
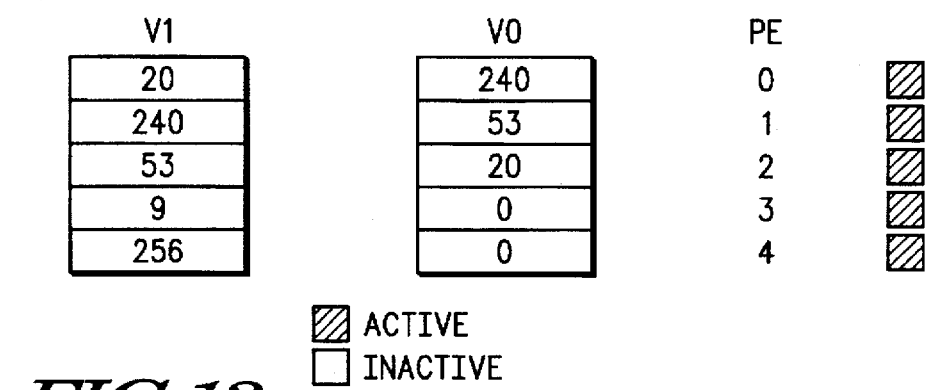
FIG. 13 illustrates vector registers utilized during the insertion sorting process after insertion of a value.

Referring to FIG. 11, there is illustrated a flow diagram describing the insertion sorting process shown along with the illustrations in FIGS. 12 and 13. At step 1101, the process begins and proceeds to step 1102 wherein all elements within the sorted output vector register V0 are initialized to zero values. Next, in step 1103, the process selects the top-most remaining element of the input vector register V1. Alternatively, the process could begin at the bottom of the vector register V1. As each element within the input vector register V1 is processed, a pointer corresponding to the current fuzzy input value being processed is incremented to that value and inserted within vector register V2 as described above with respect to FIG. 10.

In step 1104, with respect to each input vector register value, a simultaneous comparison is made between this value and all of the elements within the sorted output vector register V0. Preferably, this comparison is a "greater-than" comparison, but may be programmed to be a "lesser-than" comparison in an alternative embodiment in order to sort from greatest to least. In step 1105, should any output vector register elements be greater than the input vector register element being currently processed, the processing elements corresponding to those output vector register elements will be simultaneously deactivated. The above simultaneous operations may be performed within a parallel processor, such as SIMD processor 200. Thereafter, in step 1106, once an output vector register element not greater than the input vector register element being processed is encountered, all of the elements of the sorted output vector register V0 corresponding to processing elements that have not been deactivated are simultaneously shifted downward to the next processing elements. This may be implemented within the SIMD processor 200, which contains the capability of simultaneously communicating data between processing elements by such a downward shift process.

Next, in step 1107, the input vector element being processed is then inserted into the first processing element of the sorted output vector register that was not greater than the input vector element prior to the downward shifting of step 1106. In step 1108, all deactivated processing elements are simultaneously reactivated for the processing of the next input vector register element. Steps 1107 and 1108 are illustrated in FIG. 13, wherein the fuzzy input value 53 has now been inserted below the fuzzy input value 240 and above the fuzzy input value 20, within processing element 1. Also illustrated is the indication that all of processing elements 0–4 are now active.

In step 1109, a determination is made whether or not there are any remaining elements in the input vector. If yes, the process returns to step 1103. If no, the process ends at step 1110.

The foregoing method of FIG. 11 will continue until all non-zero (or, non-lower limit) fuzzy input values have been sorted and inserted in a sorted order within vector register V0. Processing of these non-zero fuzzy input values may then be performed as described above with respect to FIG. 10.

Figure 14:
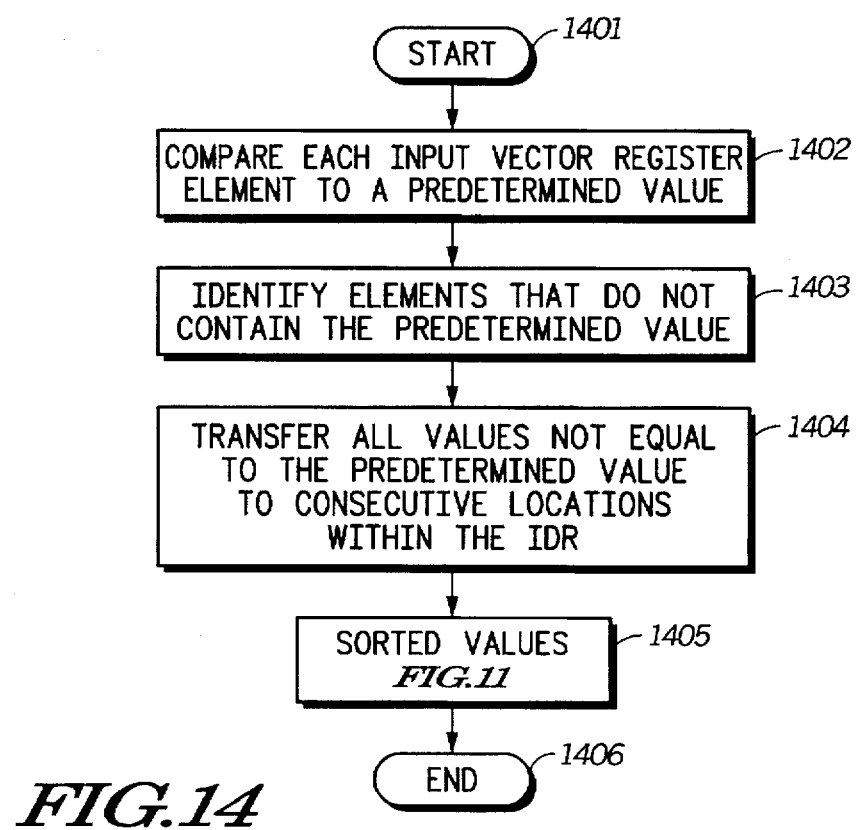
FIG. 14 illustrates a flow diagram describing a pre-processing step that may be utilized in conjunction with the process illustrated in FIG. 11.

Referring next to FIG. 14, there is illustrated a flow diagram describing a pre-processing step that may be utilized in conjunction with the process illustrated in FIG. 11 in order to sort sparse fuzzy input data (containing numerous zero (lower limit) fuzzy input values). The process begins with step 1401 and proceeds to step 1402 wherein each fuzzy input value within the input vector register is compared to zero (or, a predetermined value, e.g., a lower limit value). If a value is equal to zero (the predetermined value), that particular processing element is then disabled. In other words, all elements that do not contain zero (the predetermined value) are identified (step 1403). In step 1404, all non-zero values (values not equal to the predetermined value) are then transferred to the IDR 205 in consecutive locations. In step 1405, these non-zero fuzzy input values (values not equal to the predetermined value) are then sorted using a method such as described with respect to FIG. 11. The process ends at step 1406.

Utilizing the SIMD processor 200 described above, the transfer of the non-zero values (step 1404) may be performed through the use of the "vector write local" instruction to transfer the non-zero values to the IDR 205. The "vector write local (vwritel)" instruction mites selected vector elements to the local IDR within the same SIMD processor 200 chip, and is available in the processor discussed in U.S. patent application Ser. No. 08/040,779 referenced above.

Figure 15:
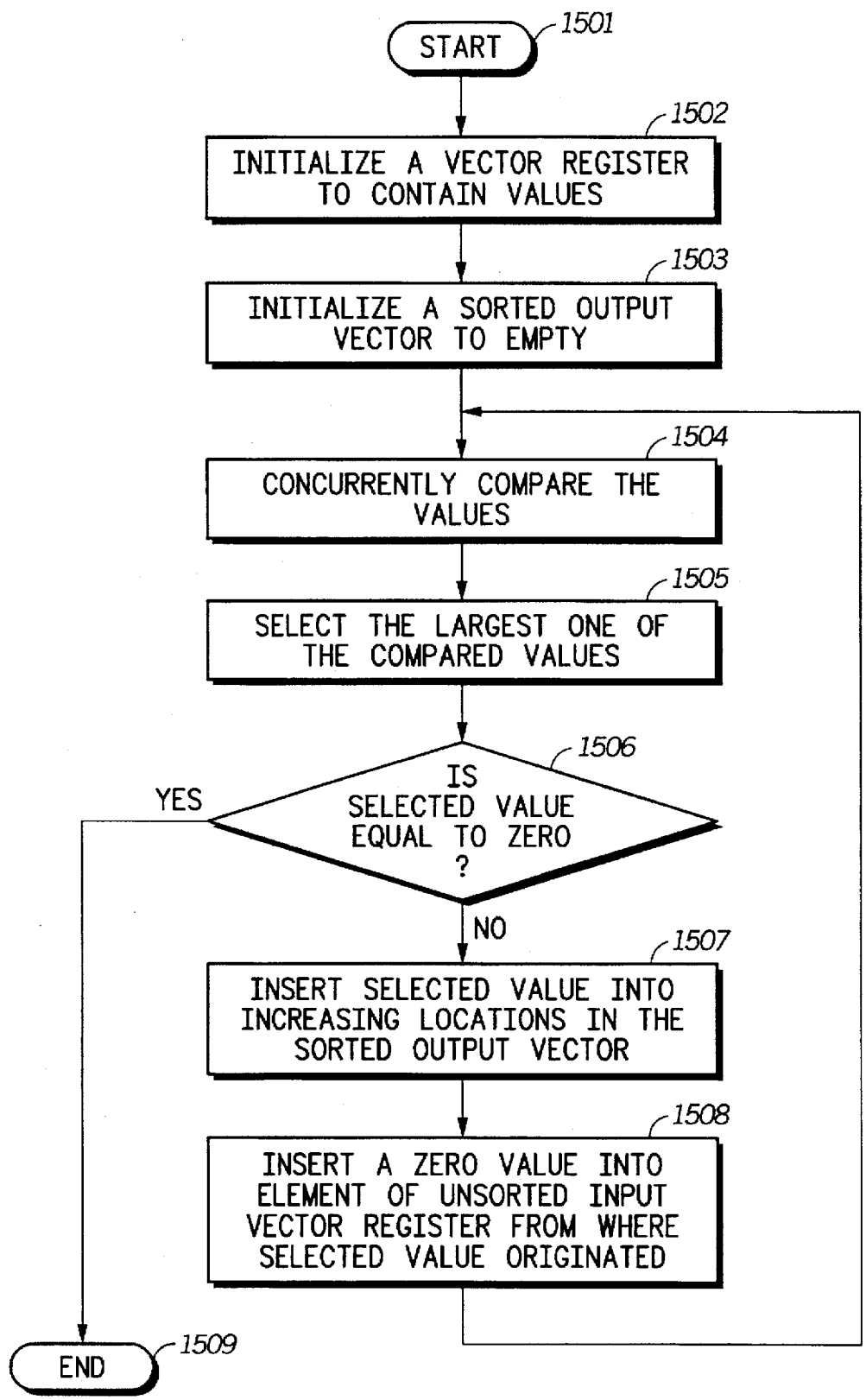
FIG. 15 illustrates an alternative embodiment for sorting values.

Referring next to FIG. 15, there is illustrated an alternative embodiment for sorting fuzzy input values. The process begins at step 1501 and proceeds to step 1502 to initialize a temporary input vector register to contain the values to be sorted. Next, in step 1503, a sorted output vector (register V0 in FIG. 10) is initialized to zero. Sorted output index pointer registers (register V2 in FIG. 10) may also be initialized to zero. In step 1504, the values within the temporary input vector register are concurrently compared to each other. This simultaneous comparing may be performed by SIMD processor 200. Thereafter, in step 1505, the largest fuzzy input value residing within the temporary input vector register is selected. In step 1506, a determination is made whether or not the selected value is equal to zero. If so, the process ends at step 1509. If not, then in step 1507, this selected value is then inserted into the next available and increasing location within the sorted output vector register V0. The corresponding pointer may then be placed within vector register V2. In step 1508, a zero value is then inserted into the element of the temporary input vector register from where the selected value originated. The process returns to step 1504.

Figure 17:
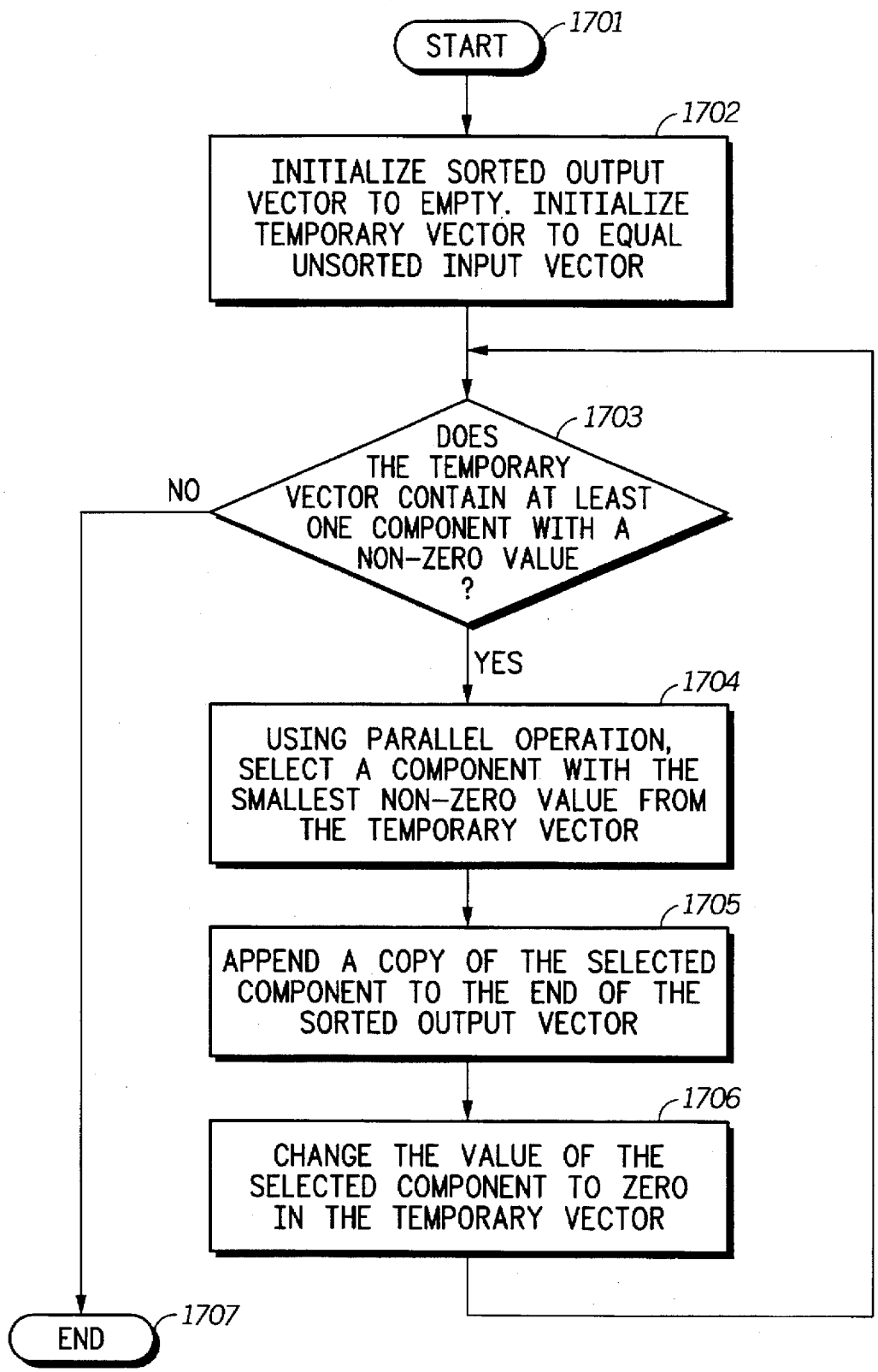
FIG. 17 illustrates a flow diagram of a method of ascending-order parallel selection sort.

The process illustrated in FIG. 15 is for a descending-order parallel selection sorting method. Refer next to FIG. 17, which illustrates a flow diagram of an ascending-order parallel selection sorting method. This process begins at step 1701, and proceeds to step 1702 wherein a sorted output vector is initialized to empty, and a temporary vector is initialized to be equal to the unsorted input vector containing the unsorted values to be sorted. Thereafter, in step 1703, a determination is made whether or not the temporary vector contains at least one component with a non-zero value. If no, the process ends at step 1707. However, if yes is the response to the determination in step 1703, the process proceeds to 1704 wherein using a parallel operation, the component with the smallest non-zero value within the temporary vector is selected. Thereafter, in step 1705, a copy of the selected component is appended to the end of the sorted output vector. Next, in step 1706, the value of the selected component in the temporary vector is changed to a zero value. The process then returns to step 1703.

In yet another alternative embodiment of the present invention, the essential steps of the alternative process illustrated in FIG. 17 may be combined with the processing of the non-zero fuzzy input values described above with respect to FIG. 10. In other words, instead of sorting the non-zero fuzzy input values prior to processing the non-zero fuzzy input values, the sorting and the processing may be performed in conjunction. Essentially, during processing of the unsorted list of non-zero fuzzy input values, the system can be configured to choose during each iteration the least (or greatest) non-zero fuzzy input value for processing. For example, during the first iteration, the lowest fuzzy input value may be processed according to the method described above with respect to FIG. 10, and then the next highest and then the next highest, and so on.

Figure 18:
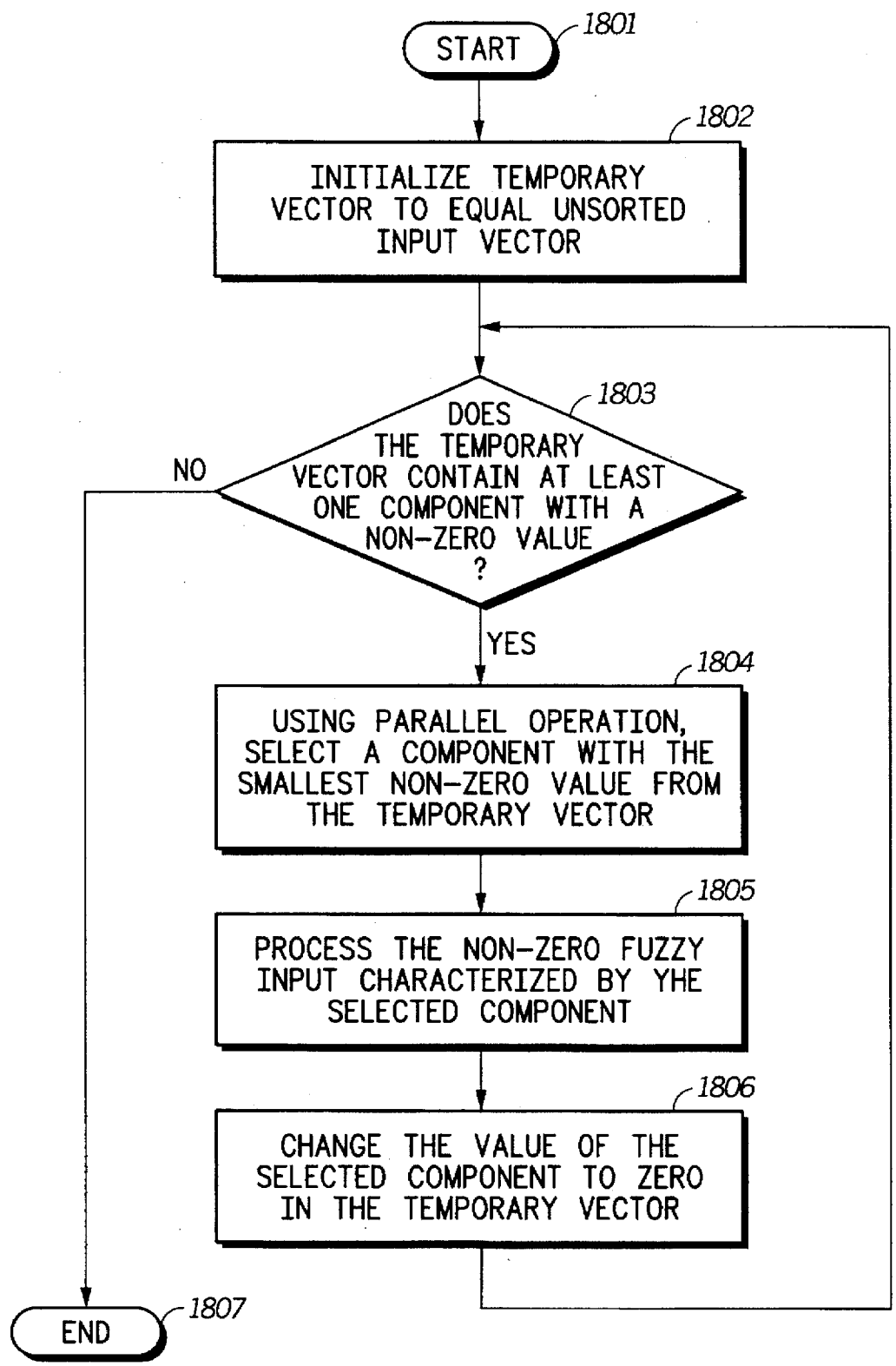
FIG. 18 illustrates a flow diagram of the combined processes of ascending-order parallel selection sort and processing of non-zero fuzzy inputs.

Referring next to FIG. 18, there is illustrated a flow diagram, which combines processing of non-zero fuzzy inputs as discussed with respect to FIG. 10 with the ascending-order parallel selection sorting method described with respect to FIG. 17. The process begins in step 1801, and proceeds to step 1802, wherein a temporary vector is initialized to be equal to the unsorted input vector. Thereafter, in step 1803, a determination is made whether or not the temporary vector contains at least one component with a non-zero value. If no, the process ends at step 1807. If yes, the process proceeds to step 1804, wherein using a parallel operation, the component with the smallest non-zero value within the temporary vector is selected. Thereafter, in step 1805, the non-zero fuzzy input characterized by the selected component is processed (see FIG. 10). Next, in step 1806, the value of the selected component in the temporary vector is changed to a zero value. The process returns to step 1803.

In the above discussion, a MIN/MAX rule evaluation process is assumed. Alternatively, a MAX/MIN rule evaluation process could be utilized, with processing not performed with respect to a lower limit value (zero), but instead processing performed with respect to an upper limit value (e.g., hexadecimal FF) in an analogous manner to the concept underlying DeMorgan's Laws. Thus, an equivalent system and method could be devised under the concepts of DeMorgan's Laws by implementing a MAX/MIN rule evaluation process.

Furthermore, the implementation of zero and one bits within the CMA 201 in order to implement the rulebase may be performed in an equivalent system by interchanging the one and zero bits and initially setting the V3 vector register to all one bits.

Figure 16:
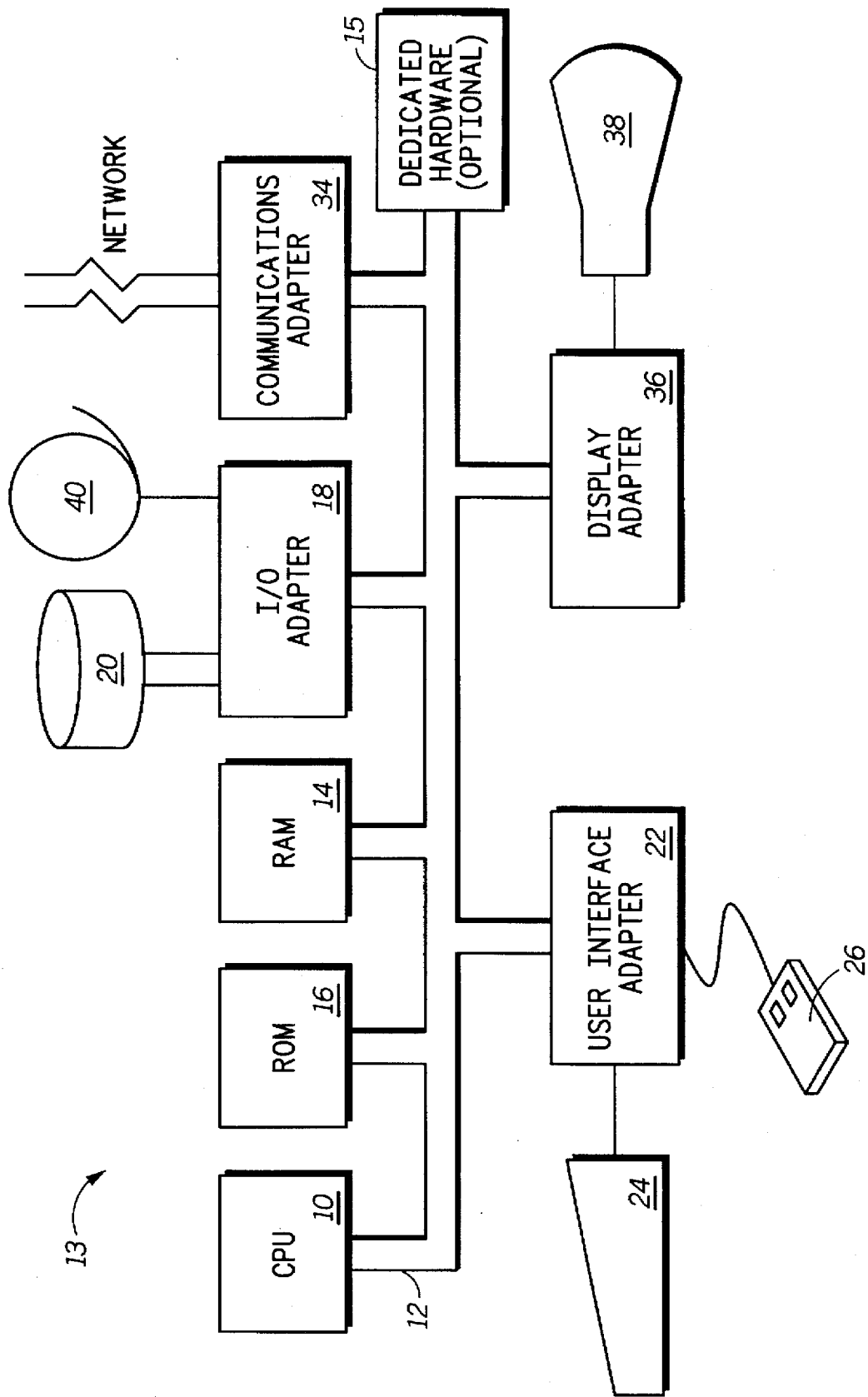
FIG. 16 illustrates a data processing system for implementing sorting of values.

The various sorting methods discussed above may be implemented within dedicated hardware 15 or within processes implemented within a data processing system 13 as depicted in FIG. 16, which illustrates a typical hardware configuration of a workstation in accordance with the subject invention having central processing unit 10, such as a conventional microprocessor, and a number of other units interconnected via system bus 12. The workstation shown in FIG. 16 includes random access memory (RAM) 14, read only memory (ROM) 16, and input/output (I/O) adapter 18 for connecting peripheral devices such as disk units 20 and tape drives 40 to bus 12, user interface adapter 22 for connecting keyboard 24, mouse 26, and/or other user interface devices such as a touch screen device (not shown) to bus 12, communication adapter 34 for connecting the workstation to a data processing network, and display adapter 36 for connecting bus 12 to display device 38. The sorting method(s) may be stored in disk units 20, tape drives 40, and/or RAM 14, or made available to system 13 via a network connection through communications adapter 34, and thereafter processed via CPU 10.

Since the apparatus for the most part is composed of electronic components and circuits known to those skilled in the art, circuit details will not be therefore explained to any greater extent than necessary for understanding and appreciating the underlying concepts of the present invention.

Although the present invention and its advantages have been described in detail, it should be understood that various changes, substitutions and alterations can be made herein without departing from the spirit and scope of the invention as defined by the appended claims.

We claim:

1. In a data processing system, a method for performing a fuzzy logic operation, said method comprising the steps of:
    performing a rule evaluation process on a plurality of fuzzy input values, wherein one or more of said plurality of fuzzy input values has a lower limit value, said rule evaluation process implementing a rulebase comprising a plurality of rules associating a plurality of fuzzy inputs with a plurality of fuzzy outputs, said rule evaluation process resulting in one or more fuzzy output values, said rule evaluation process further comprising:
    initializing each of said plurality of fuzzy outputs to said lower limit value;
    initializing a storage register associated with a particular one of said plurality of fuzzy outputs to contain a bit value;
    performing a logical operation between said bit value contained in said storage register and bits contained within a portion of a column in a memory array associated with said one of said plurality of fuzzy inputs which is associated with said particular one of said plurality of fuzzy outputs through said rulebase, and storing a logical operation result value back into said storage register;
    comparing the logical operation result value to a predetermined value and disabling processing if the result value equals the predetermined value; and
    processing one or more other fuzzy input values having a non-lower limit value with respect to said rulebase, said processing of said one or more other fuzzy input values having said non-lower limit value performed separately from said processing of said one or more of said fuzzy input values having said lower limit value.

2. In a data processing system, a method for performing a fuzzy logic operation, said method comprising the steps of:
    performing a rule evaluation process on a plurality of fuzzy input values, wherein one or more of said plurality of fuzzy input values has a lower limit value, said rule evaluation process implementing a rulebase comprising a plurality of rules associating a plurality of fuzzy inputs with a plurality of fuzzy outputs, said rule evaluation process resulting in one or more fuzzy output values, said role evaluation process further comprising:
    processing said one or more of said plurality of fuzzy input values having said lower limit value with respect to said rulebase;
    processing one or more other fuzzy input values having a non-lower limit value with respect to said rulebase, said processing of said one or more other fuzzy input values having said non-lower limit value performed separately from said processing of said one or more of said fuzzy input values having said lower limit value;
    storing said plurality of rules in a memory array, wherein each of said plurality of fuzzy inputs is associated with a column in said memory array, and wherein each of said plurality of fuzzy outputs is associated with a row in said memory array, wherein each of said plurality of rules corresponding to a particular one of said plurality of fuzzy outputs is stored within a subrow of said row, a length of said subrow equaling a number of said plurality of fuzzy inputs;
    inputting said plurality of fuzzy input values into a storage means, wherein each of said plurality of fuzzy input values corresponds to one of said plurality of fuzzy inputs;
    initializing each of said plurality of fuzzy outputs to said lower limit value;
    initializing a vector register associated with said plurality of fuzzy outputs to zero;
    for each of said one or more of said fuzzy input values having said lower limit value, performing a logical operation between bits of said vector register and bits of said column in said memory array corresponding with said each of said one or more of said fuzzy input values having said lower limit value;
    upon completion of processing of all columns in said memory array corresponding to said each of said one or more of said fuzzy input values having said lower limit value, disabling processing with respect to said each of said plurality of fuzzy outputs containing said lower limit value when all bits of said vector register corresponding to said each of said plurality of fuzzy outputs and corresponding to rules associated with said each of said plurality of fuzzy outputs contain predetermined bits;
    for each of said one or more other fuzzy input values having said non-lower limit value, performing a logical operation between bits of said vector register and bits of said column in said memory array corresponding with said each of said one or more other fuzzy input values having said non-lower limit value;
    for each of said one or more other fuzzy input values having said non-lower limit value, transferring said non-lower limit value to said fuzzy output associated to said each of said one or more other fuzzy input values having said non-lower limit value; and
    when all bits of said vector register corresponding to said fuzzy output associated to said each of said one or more other fuzzy input values having said non-lower limit value contain predetermined bits, discontinuing processing with respect to said fuzzy output.

3. In a data processing system, a method for performing a fuzzy logic operation, said method comprising the steps of:
    performing a rule evaluation process on a plurality of fuzzy input values, wherein one or more of said plurality of fuzzy input values has a lower limit value, said rule evaluation process implementing a rulebase comprising a plurality of rules associating a plurality of fuzzy inputs with a plurality of fuzzy outputs, said rule evaluation process resulting in one or more fuzzy output values, said rule evaluation process further comprising:

processing said one or more of said plurality of fuzzy input values having said lower limit value with respect to said rulebase;

processing one or more other fuzzy input values having a non-lower limit value with respect to said rulebase, said processing of said one or more other fuzzy input values having said non-lower limit value performed separately from said processing of said one or more of said fuzzy input values having said lower limit value;

sorting said plurality of fuzzy input values;

(a) comparing each of said plurality of fuzzy input values to said lower limit value;

(b) if one or more of said plurality of fuzzy input values is equal to said lower limit value, discontinue processing with respect to said one or more of said plurality of fuzzy input values equal to said lower limit value; and (c) transferring all non-lower limit fuzzy input values to a separate storage means, wherein steps (a)–(c) are performed previously to said sorting step.

4. A data processing system for performing a fuzzy logic operation, said system comprising:

input means for receiving a plurality of fuzzy input values, wherein one or more of said plurality of fuzzy input values has a lower limit value;

first storage means for storing said plurality of fuzzy input values, wherein one or more of said plurality of fuzzy input values has a lower limit value;

second storage means for storing said plurality of rules in a memory array, wherein each of said plurality of fuzzy inputs is associated with a column in said memory array, and wherein each of said plurality of fuzzy outputs is associated with a row in said memory array, wherein each of said plurality of rules corresponding to a particular one of said plurality of fuzzy outputs is stored within a subrow of said row, a length of said subrow equaling a number of said plurality of fuzzy inputs; and processor means for performing a rule evaluation process on said plurality of fuzzy input values, said rule evaluation process utilizing a rulebase comprising a plurality of rules associating a plurality of fuzzy inputs with a plurality of fuzzy outputs, said rule evaluation process resulting in one or more fuzzy output values, wherein said processor means (i) initializes each of said plurality of fuzzy outputs to said lower limit value, (ii) initializes a vector register associated with said plurality of fuzzy outputs to zero, (iii) for each of said one or more of said fuzzy input values having said lower limit value, performs a logical operation between bits of said vector register and bits of said column in said memory array corresponding with said each of said one or more of said fuzzy input values having said lower limit value, (iv) upon completion of processing of all columns in said memory array corresponding to said each of said one or more of said fuzzy input values having said lower limit value, disables processing with respect to said each of said plurality of fuzzy outputs containing said lower limit value when all bits of said vector register corresponding to said each of said plurality of fuzzy outputs and corresponding to rules associated with said each of said plurality of fuzzy outputs contain predetermined bits, (v) for each of said one or more other fuzzy input values having said non-lower limit value, performs a logical operation between bits of said vector register and bits of said column in said memory array corresponding with said each of said one or more other fuzzy input values having said non-lower limit value, (vi) for each of said one or more other fuzzy input values having said non-lower limit value, transfers said non-lower limit value to said fuzzy output associated to said each of said one or more other fuzzy input values having said non-lower limit value if said fuzzy output is still enabled, and (vii) when all bits of said vector register corresponding to said fuzzy output associated to said each of said one or more other fuzzy input values having said non-lower limit value contain second predetermined bits, discontinues processing with respect to said fuzzy output.

5. A data processing system for performing a fuzzy logic operation, said system comprising:

input means for receiving a plurality of fuzzy input values, wherein one or more of said plurality of fuzzy input values has a lower limit value;

storage means for storing said plurality of fuzzy input values, wherein one or more of said plurality of fuzzy input values has a lower limit value;

processor means for performing a rule evaluation process on said plurality of fuzzy input values, said rule evaluation process utilizing a rulebase comprising a plurality of rules associating a plurality of fuzzy inputs with a plurality of fuzzy outputs, said rule evaluation process resulting in one or more fuzzy output values, said processor means including (1) means for processing said one or more of said plurality of fuzzy input values having said lower limit value with respect to said rulebase, and (2) means for processing one or more other fuzzy input values having a non-lower limit value with respect to said rulebase, said processing of said one or more other fuzzy input values having said non-lower limit value performed separately from said processing of said one or more of said fuzzy input values having said lower limit value;

means for sorting said plurality of fuzzy input values;

means for comparing each of said plurality of fuzzy input values to said lower limit value;

if one or more of said plurality of fuzzy input values is equal to said lower limit value, means for discontinuing processing with respect to said one or more of said plurality of fuzzy input values equal to said lower limit value; and means for transferring all non-lower limit fuzzy input values to a separate storage means.

6. A method for sorting values, said method comprising the steps of:

(a) initializing a vector register to contain said values;

(b) initializing a sorted output list to empty;

(c) concurrently comparing said values in said vector register to each other;

(d) selecting an element of said vector register containing a largest one of said values;

(e) appending said selected element to said sorted output list;

(f) inserting a lower limit value into said selected element of said vector register previously occupied by said largest one of said values;

(g) deleting all occurrences of a predetermined value from said list of values, said step of deleting further comprising the steps of:

concurrently comparing all of said values of said list to said predetermined value;

identifying said values that do not contain said predetermined value; and transferring said values that do not contain said predetermined value to consecutive locations within a second list, wherein said method sorts said second list.

* * * * *